Dec. 25, 1956 O. J. MUNZ 2,775,758

PHOTO-GLYPH RECORDING

Filed May 25, 1951 2 Sheets-Sheet 1

INVENTOR
Otto John Munz

Dec. 25, 1956 O. J. MUNZ 2,775,758

PHOTO-GLYPH RECORDING

Filed May 25, 1951 2 Sheets-Sheet 2

INVENTOR

Otto John Munz.

BY

ATTORNEY

United States Patent Office 2,775,758

Patented Dec. 25, 1956

2,775,758

PHOTO-GLYPH RECORDING

Otto John Munz, Annapolis, Md.

Application May 25, 1951, Serial No. 228,180

18 Claims. (Cl. 343—17)

Figure 1:
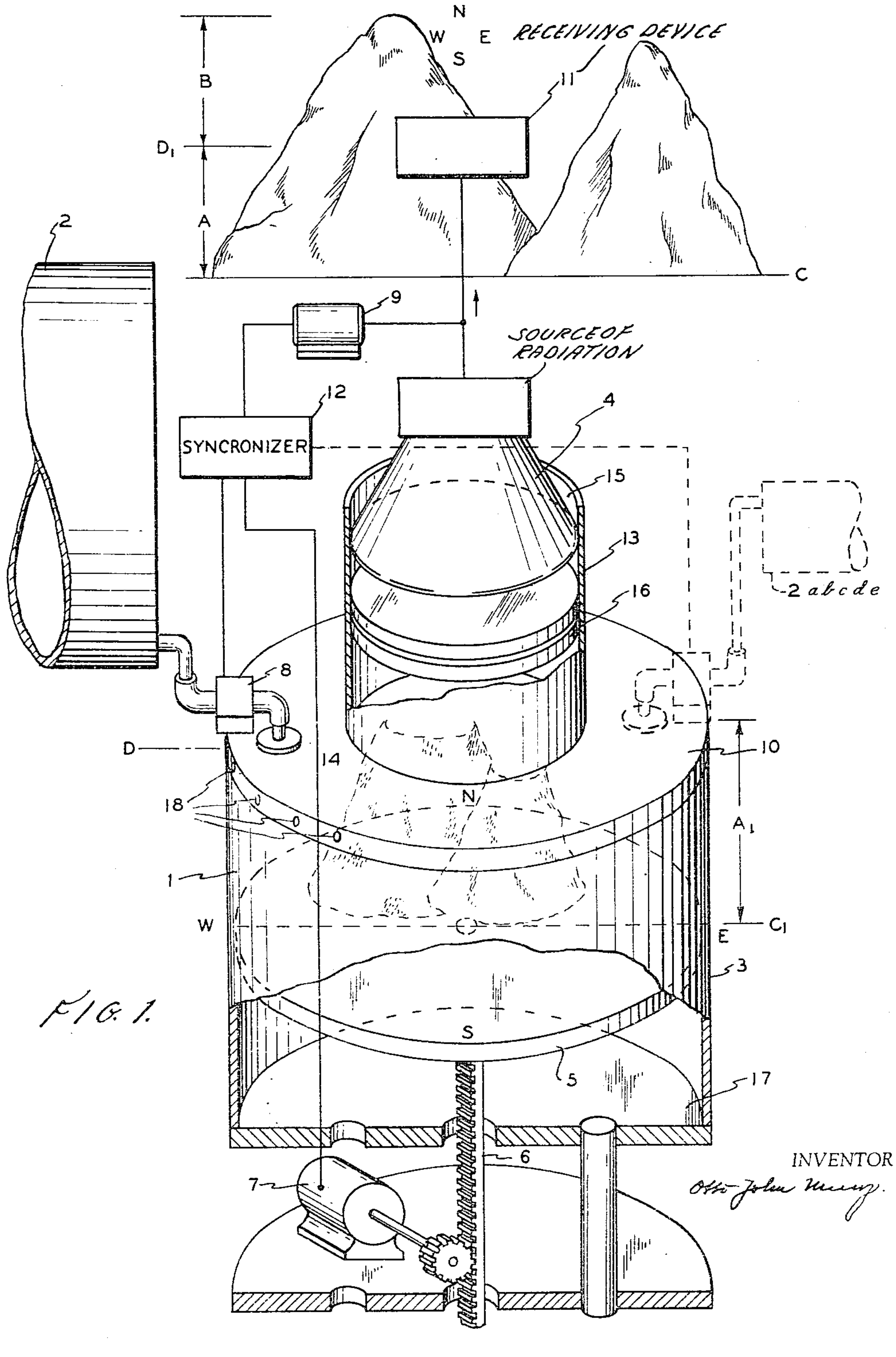

This invention relates to recording devices and more particularly to a method, apparatus and product involving two or more dimensional records in space of the existence, magnitudes, quantities, qualities, changes and interrelations in matter, energy, force, motion, impulses or other phenomena occurring in space, time or distance, and for representing in several dimensions mental perceptions and objects of thoughts.

This is a continuation in part of my co-pending U. S. patent application, Serial No. 199,199, on Glyph Recording, filed on December 5, 1950.

An object of this invention is to photo-record phenomena, representable in three dimensions, in a recording space, defined by a container, filled with a photo-sensitive medium.

An object of this invention is to provide a novel method and apparatus for the creation of a permanent three-dimensional record in space of three-dimensional phenomena, such as the shape of physical bodies. This record, since it is not a graph and does approach the idea of a carving, hereinafter will be called a glyph, from the Greek "glypho" which means "to carve." It is produced with the aid of photographic means and therefore is called a photo-glyph.

Another object of this invention is to provide a photo-glyph recording method, apparatus and product for recording in space a plurality of interrelated variables, such as mathematical functions, transient signals, aperiodic pulses, or a plurality of magnitudes together with a time and/or distance representation.

Another object of this invention is to provide a photo-glyph recording system, capable of creating three-dimensional glyphs of bodies in the shape of three-dimensional surface maps called topoglyphs, as yet produced by topographical methods.

Another object of this invention is the photoglyph recording of the shapes and courses of oil-wells, mines, etc. together with their topographical orientation.

Another object of this invention is the provision of three-dimensional matrixes of bodies and shapes of photoglyph recording for the purpose of physical three-dimensional reproduction.

With these and further objects in view, as may become apparent from the within disclosure and from the disclosures made in the parent application, the invention consists not only in the method, apparatus and structure herein pointed out, but includes further methods, apparatus and structures coming within the scope of what may be claimed.

The nature of the invention will be apparent from the following disclosure taken in conjunction with the accompanying drawing, and claims, and taken in conjunction with the above cited parent application.

The first figure of the drawing combines a schematic diagram of known methods and mechanisms together with a perspective view of novel elements, with sections broken away, to illustrate the basic principles of a photo-glyph-recording method and apparatus. The invention is not limited to the structure shown.

Figure 2:
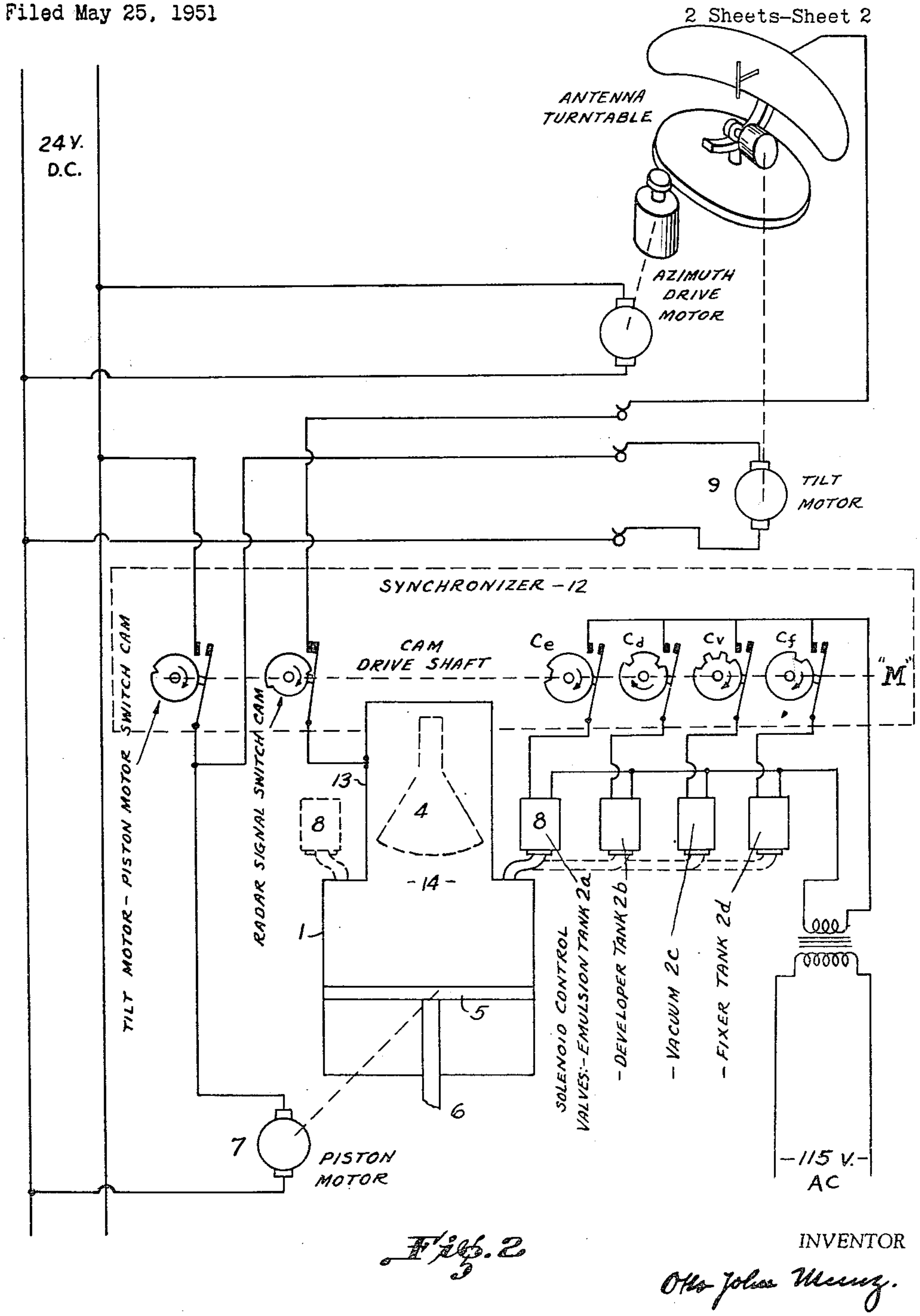

Fig. 2 is an exemplary schematic circuit diagram of the embodiment of the invention shown in Fig. 1.

Attempts for three-dimensional representation of a plurality of variables are not entirely novel. References are cited, for instance, in U. S. Patent No. 2,544,624, to James L. Whittaker. The prior art provides a three-dimensional transient picture, when the luminiscent screen of a cathode ray tube or tubes is viewed stereoscopically.

In my above cited co-pending parent application, a photo-glyph method and apparatus are outlined, which are here recited and applied to the drawing of the present application.

Referring to the drawings, the photo-glyph recording method provides an expanding recording space 1, a light source 4, a photo-chemical supply 2. The recording space is defined by a cylinder 3, inside of which operates a piston 5. At the beginning of the recording, the piston 5 is positioned at close proximity to the recording table-frame 10 at the horizontal level D, and during recording it is drawn away from 10 by a piston rack 6, at a speed controlled by motor 7. Thus an expanding recording space 1 is created. There are other mechanical possibilities to create an expanding recording space and the invention is not limited to the one shown here. A tank 2 is connected by pipe-line and valve 8 to the top of the recording space 1. A self-developing, self-fixing and solidifying transparent photo-emulsion, which will be discussed hereinafter, continuously keeps the recording-space 1 filled to the recording level D. Conventional means are provided to keep undesired light-exposure from the emulsion in tank 2 and cylinder 1. The table-frame 10 has a central opening 14, merging into a black-tube 13, to form a dark-room receptacle for the light-source 4. The black-tube 13 may also serve as a housing for an optical system 16, which is used for enlarging, reducing or collineating the light-projection received from source 4.

While the piston 5 is moving away from D and thus expanding the container 1, the tank 2 admits enough photo-emulsion to keep its surface continuously at level D. The path of the photo-generative rays is controlled mechanically, optically or electronically in response to the phenomena to be recorded. The rays from source 4 are projected upon the top layer of the emulsion to expose it, and the emulsion is developed, fixed and solidified. Thus a picture similar to a two-dimensional film picture is obtained. After that the piston moves a prearranged distance away from D to a new horizontal level below. A new layer of photo-chemical material is admitted from 2 through 8 on top of the first picture at the recording level D. The source 4 provides a new exposure and the development, fixing and solidifying is repeated. Through a succession of these steps a plurality of exposed transparent film layers is piled up consecutively in response to the light-phenomena recorded. Thus a transparent solid or semisolid glyph mass is obtained carrying within itself an exposed glyph, i. e. visible three-dimensional structures, representative of the light-phenomena causing their existence. The glyph is housed in the cylinder 3, and after recording it may be removed from the recording apparatus together with the head of the piston 5, which then serves as the bottom of the recording container. The cylinder 3 and the head of the piston 5 may carry calibrations to aid the observer in reading and understanding the glyph-formations. For this purpose photo or mechanical markers may be provided, which will be described in detail hereinafter.

The glyph-formation may be subjected to a photo-chemical etching process, removing the exposed or the unexposed portions and thus providing the photo-glyph, i. e. a true sculpture or a matrix of the recorded phenomena. The solidified mass may be removed from the cylinder and the exposed or unexposed parts may be handled and carved out manually to isolate the photoglyph.

As mentioned in the discussion of the step-by-step photo-processing which is found later in the specification, the casting of a conventional silver halide colloid emulsion in the tank 2 will provide after exposure, development and fixing, the usual negative image in each layer of such casting. By building up the layers in height or thickness in successive silver halide photographic processing operations, each scanned sector defined by the rotation of the radar antenna reflector produces a corresponding image-wise reproduction in depth in the layer which produces a reproduced image segment in a thickness proportional to the thickness or height of the scanned sector.

The cathode ray tube screen useful as one type of light source may be replaced by any convenient light source in a suitable optical sectoring system. Such systems are well known, particularly in the art known as "photo-sculpture," for example see the U. S. patents to Baese, U. S. 774,549, November 8, 1904, or Marioka, U. S. 2,350,796, June 6, 1944, 2,015,457, September 24, 1935, or Hutchison, U. S. 1,516,199. These patents show the production of sculptured or relief effects in such photosensitive materials as in bichromated gelatine layer or in a silver halide colloid layer by optically sectoring sections of the object being photographed, exposing corresponding sectored sections or layers of the silver halide or bichromated gelatine photosensitive colloid, each being exposed separately by the light from the optical sectoring operation, whereafter the separate exposures in separate film sections are processed by standard procedures of developing, fixing, washing and drying to provide elements which may be trimmed and pasted together to make the 3 dimensional sculptured reproduction.

The photosensitive colloid material, whether silver halide or bichromated gelatine may produce a positive image from the exposure of the object or a negative image from such exposure, the last being the more conventional. As is known in the art, for example see Dreywood, U. S. 2,525,532, positive silver halide emulsions (column 2, line 3) may be rapidly developed and fixed after exposure in a combined developing and fixing bath containing fixing stabilizers whose continuing action is effectively stopped after immersion for 1 to 2 minutes by treating with a dilute acetic acid stop bath. The conventional silver halide emulsions may be converted into direct positive emulsions in known ways, for example by "solarization" exposure or by such treatment as disclosed in Crouse et al., U. S. 2,401,051. In any event positive emulsions or negative emulsions may be treated with various combinations of developing solutions, fixing solutions and washing solutions from tanks 2*a*, 2*b*, 2*c* and 2*d* as is shown in Fig. 2 of the drawing.

The emulsion admitted into container 1 from the emulsion tank 2 is exposed by the sectored light rays from the source 4 whereafter the emulsion is developed, fixed and stopped in the usual way. Vacuum tank 2*c* can be used to adjust the solidification of the pourable liquid emulsion after casting and before exposure. Conventional hardening materials which assist the control of the rigidity of the emulsion include formaldehyde for example, and this may be added during the processing of the emulsion as desired.

Accordingly, the successive steps of exposing the succeeding layers after the development, fixing and stopping of the previously exposed layer builds up the layers to form a continuous extension along the vertical direction of the matching sector images to provide a 3 dimensional reproduction within colloid containing the photosensitive material.

It is therefore seen that the method of the present invention may employ any of the conventional photosensitive materials which vary only in their sensitivity to exposure, which factor may be adapted in accordance with the nature of the illumination available for taking a photograph of the object. As mentioned herein, direct positive reproduction processes and conventional emulsion materials producing such reproductions are preferred. The departure from the prior art is in the mechanical casting of the unexposed photosensitive colloid in successive stages after each sectored reproduction has been exposed, developed and fixed which builds up a substantially homogeneous 3 dimensional body containing the 3 dimensional image reproduction without suffering the disadvantage of having to slice up separate layers and stick them together as is taught in the prior art of photosculpture.

The head of the piston 5 may be provided with centered collinear and angular calibrations. The cylinder 3 may be provided with horizontal and vertical calibrations. Markers may be provided within the glyph-mass photomechanically or markers in the shape of rulers may be inserted. Thus the photoglyph may be investigated by ruler protractor or the naked eye.

The light source 4 may be one or more conventional mechanisms used for creating a photo exposure on paper or film, such as a photo-camera, an X-ray apparatus, an oscillograph, or an electron gun; generally any mechanism producing photo-generative rays, i. e. rays capable of exposing a photosensitive material.

This novel recording method initiates many new uses in combination with known recording instruments and methods. The present continuation in part illustrates the basic invention in combination with a conventional radar system, however is not limited to it.

In the drawing Fig. 1 the radar system is schematically indicated together with a schematic indication of a radar antenna and reflector. The phenomena to be recorded are shown in the background of the antenna as a simple topographical situation of two mountains, the higher mountain having an elevation A plus B. The scanning begins at the horizontal line C. The antenna-reflector rotates or semi-rotates horizontally. After each rotation the antenna scans the horizon at a prearranged level higher than the previous level scanned. This may be achieved by various methods. The antenna may be raised vertically at a prearranged rate of speed, for instance by motor 9, by mechanical methods, such as a rack, telescope, hydraulic means, or by airborne means, such as by a balloon, or a helicopter. Or the antenna may be provided with tilting means, such as a gun mount, allowing for azimuth scanning at an angle increasing or decreasing at a prearranged rate of speed. These are conventional means discussed in technical literature on radar equipment, as in "Radar Systems and Equipment," by Bell Laboratories Staff, published by D. Van Nostrand Company, New York, 1949; in "Encyclopedia on Cathode Ray Oscilloscopes," by John F. Rider Publ. Inc., New York, 1950; in "Encyclopedia on Radar Systems," by John F. Rider Publ. Inc., New York, 1950; in "Principles of Radar Engineering," by Donald Fink, a McGraw Hill publication first edition, 1947, page 27, sec. 10; U. S. patent to R. H. Ranger, No. 2,603,777, U. S. patent to C. M. Tuttle et al., No. 2,446,668, and U. S. Patent No. 2,616,077 to W. T. Holser; and other publications.

The methods and apparatus for making two-dimensional pictures from the luminescent screens of cathode ray oscilloscopes of radar systems are known. Various cathode ray tubes are on the market for such a purpose; tubes preferably equipped with a purple luminescent screen having a particularly photo-genic duration of persistency. Such is, for instance, the RCA 5 UP 11 tube. Various photo-mechanical and photo-chemical processes for this are described in technical literature, for instance in: "Encyclopedia on Cathode Ray Oscilloscopes" and "On Radar Systems" by John F. Rider Publ. Inc., 1950, New York; "Radar Systems," by Bell Laboratories Staff, 1949, D. Van Nostrand Company, New York.

The Fairchild Camera and Instrument Corporation, Jamaica, L. I., put on the market a polaroid oscilloscope recording camera, which takes 1 minute to finish and print pictures from the luminescent screen of a cathode ray tube.

U. S. Patent 2,489,253 to Andre, and references thereto, describe a continuous filming method from the screen of a cathode ray tube.

Any of these methods and others known may be used in combination with my present invention. The here-described three-dimensional recording process may be carried out by step by step conventional photographing method. Thus tank 2 shown in the drawing may serve as a carrier of a photo-emulsion, while developer, fixer and solidifier and means to wash out the used chemicals each may be separately stored in an additional tank schematically indicated as 2 *a*, *b*, *c* and *d*. Each tank is provided with pipe and system valve analogous to 8 in tank 2, each of said valves being controlled, for instance, by the synchronizer. Drying means may be provided conventionally. Another tank similar to 2 may hold photo-etching materials. Photo-accelerators and solidifiers may be added. All these various steps of handling the exposed emulsion, some of which are optional, hereinafter will be referred to as photo-processing, only. Outlets 18 or other means may be provided to dispose of used chemicals. A clock mechanism or a timer, or an electronic timer, such as are on the market, hooked up with the synchronizer, may handle separately this photo-processing phase of the recording process.

Fig. 2 illustrates a radar antenna system control circuit taken from United States Navy publication NavShips 900,017, pages 99–100, and there is also illustrated the synchronizer and photoprocessing devices as in Tuttle, U. S. 2,446,668. The tilt motor-piston motor switch cam in the synchronizer 12 shown in Fig. 2 simultaneously operates the piston motor and the tilt motor to lower the piston and to raise the antenna. The radar signal switch cam in synchronizer 12 interrupts the radar signal during the processing of the emulsion in the cylinder. The cam drive shaft of the synchronizer functions to control the timing of the elevation of the radar system and of the elevation of the piston motor control with the solenoid control valves 7 coacting with switch cams C*e*, *d*, *v* and *f* to regulate the flow of the emulsion and the developer, fixer, stop, etc. solutions as may be required for the particular emulsion material and also the vacuum system to and from supply tanks 2*a*, 2*b*, 2*c* and 2*d*.

However this step by step photo-processing method is being described only to evaluate all the basic steps. Recent achievements in photo-chemical engineering have created short cuts in photo-processing, which are advantageous to the present invention. The step by step liquid developing and fixing may be substituted by quick developers and fixers advanced to the exposed emulsion in gases, fumes or fogs. Such art is shown, for instance, in U. S. Patents No. 2,497,917 and No. 2,497,875 and is used in Ansco's ozalid process. A transparent mass such as a transparent gelatin, or hardening materials may be included in the emulsion as a filler or coagent to solidify or semi-solidify it.

The development thought to be the most suitable for the present purpose is the photo-processing which leaves the developer and fixer behind in the exposed emulsion. This art is explained, for instance, in the Swiss Patent No. 115,331 K1.57b 1933, to Rigler; in U. S. patent application Ser. No. 594,589 to Yackel of May 18, 1945, now abandoned; in U. S. Patent Nos. 2,230,976 to Ham, 2,304,962 to Sheppard, and 2,525,532 to Dreywood who describes the processing of an exposed silver halide emulsion and hardening of the negative emulsion before or during the development with a formaldehyde bath, and in technical literature.

The exposed or unexposed parts of the emulsion mass may be removed by etching them out photo-chemically in ways conventionally employed in the photogravure art. It also may be done manually by carving. Thus by the method and apparatus here shown a three-dimensional photo-glyph or its structural dia-positive or negative matrix, representative of the phenomena recorded may be obtained.

In accordance with the present disclosure the photo-glyph recording proceeds in the following steps:

Firstly: The radar antenna-reflector is set for a horizontal scanning at the horizontal level, from which the recording has to begin. In the drawing this level is shown as the lowest level, indicated by line C. At the same time the piston 5 is set at the recording level D with the first layer of emulsion poured out. At this time the level D is identical with the level C, of the piston. The scanning rotation of the radar antenna-reflector produces a transient spot or spots on the screen of the radar-cathode ray tube. Said spot or spots proportionally correspond in position and range to the targets scanned by the antenna-reflector. The transient record from the cathode-ray tube screen is projected through the black tube 13 directly or through the lens system 16 and through the opening 14 in the table frame 10 to expose the layer of emulsion on the horizontal level D. The synchronizers are well known to the art and such as described in U. S. patent to Bossomworth No. 2,290,626 may be readily used for this purpose.

Secondly: The synchronizer shuts off the radar system, actuates the motor 9 to position the antenna-reflector for scanning at the next higher level above C. Simultaneously the synchronizer actuates the motor 7 to lower the piston 5 to the next lower level below D. The raising of the scanning level of the antenna-reflector and the lowering of the piston 5 are in selected proportions. During this time the electronic timer takes care of the photo-processing and a new layer of photo-emulsion is poured into the recording container on top of the last exposed and finished film.

The above two basic steps are repeated for the duration of the recording. Present development in the photo-chemical engineering indicate the possibility of transforming these two steps into one almost continuous procedure.

In the drawing, the recording process is shown progressed about half-way. The antenna reflector is indicated as scanning higher at a level D1 shown at a distance A from the beginning level C. At the same time the piston 5 traveled a proportionally corresponding distance A1 from recording level D to its present lower level. Thus about the lower half of the height of the two mountains shown in the drawing has been scanned and the scanning is shown at the level D1. Simultaneously a half of the photo-glyph of the two mountains is shown produced in the recording space. If the recording would have been shown completed the piston 5 would be at the bottom of the container above 17, and the photo-glyph made so far would have traveled with the piston to the lower half of the container. At the same time the scanning would have proceeded the additional height B to the top of the mountains and the photo-glyph of the mountains would have been built up to their tops, too. Topo-glyphic three-dimensional profiles of landscape, taken from neighbouring points, may be cut off at border lines of duplication and matched from adjoining records.

The scanning may be made from an angle or completely reversed. For instance, it may begin at the highest point desired to be recorded and progress downward.

The container may be used as a non-expansible recording space and the piston may be eliminated entirely. Instead the emulsion forms its first layer at the bottom 17 and during recording it progresses upward in piling up its layers. In such a case a focusing lens system 16 travels vertically within the black tube 13, always to focus at the raising recording level of the emulsion.

The container may be filled prior to the recording at once with the self-processing transparent emulsion and exposed. This exposure may be achieved by one or more sources 4, exposing the photo-emulsion from selected spaced angles from points in the circumference of said container. In this case the container is to be provided with transparent walls admitting optical images, or if the sources 4 are electron guns, with suitable openings analogous to the system shown in the drawing.

The container 3 may consist of two coaxial cylinders, the outer protecting the emulsion from undesirable light and the inner being transparent. The inner cylinder may be provided with horizontal and vertical markings. After recording the inner cylinder may form a permanent wall to the glyph-record. The piston head may be provided with a transparent calibrated cover, for instance marked in compass directions, as shown in the drawing. After recording, the cover remains in the recording cylinder and serves there as the bottom of the container. Horizontal and vertical photo-marking lines may be exposed through the glyph record during recording by applying spaced light beams to the photo-emulsion. Such art is shown in U. S. Patent No. 2,428,369 to Kammer and in references cited thereto.

The light source 4 may be any source producing photogenerative rays, i. e. rays capable of exposing a photo-emulsion, such as an electron gun, an X-ray tube, a source of alpha, beta or gamma rays, a photo-camera system, a projection lantern, a conventional wire filament lamp, an isolated beam of linear light. The light source 4 may be controlled by one or more phenomena detectors, such as the five human senses, measuring instruments, light-, sound-, energy-, force-, or motion-detectors, computers and so forth. The detected phenomena are translated into functions of the light source by translators such as a radar antenna-reflector system, an X-ray system, an electron gun, a galvanometer, an oscilloscope or a lens system through which the light beams are projected.

I claim:

1. A method for producing a photo glyph record of three magnitudes, comprising a plurality of cycles, each cycle including the steps of detecting the first and second magnitudes to be recorded, of translating said two magnitudes into a two-dimensional actinic radiation, of aligning with said radiation a layer of a photo-emulsion of the silver halide type in a transparent medium suspension, of exposing said layer at a predetermined focus with said radiation, of developing and fixing said photo emulsion, of covering said fixed layer of photo emulsion with another layer of unexposed photo emulsion and of bringing said unexposed layer of said photo emulsion into said predetermined focus with said radiation and of repeating said cycle, the number of repetitions being controlled by the third magnitude recorded.

2. The process of reproducing objects to produce three dimensional reproductions comprising the steps of scanning a predetermined first sector of the object extending along the vertical direction from base surface of the object, converting the scanning of said sector into a light image which can be projected to expose a light sensitive colloid emulsion, casting a light sensitive emulsion layer in a container which is movable in a vertical direction corresponding to the vertical direction of the scanning operation, exposing said emulsion layer in said container to the light from said light image corresponding to said predetermined scanned sector, developing, fixing and hardening said exposed emulsion to produce an image in said layer corresponding to the sector of the object which is scanned, and repeating said operations by scanning along successive sectors along said vertical direction, each scanning followed by converting into a light image, casting an additional emulsion layer on the last hardened image emulsion, developing, fixing and hardening to build up successive sectored image layers in the container which are in registration with each other to produce a three dimensional reproduction within all of the layers disposed along the vertical axis of the container.

3. A method as in claim 2 wherein said container is moved along its vertical axis in correspondence with the sectoring scanning movement along the vertical axis of the object to bring each freshly exposed, developed, fixed and hardened emulsion layer into registration with the previous layer.

4. A method as in claim 2 wherein said emulsion layer is a silver halide emulsion.

5. A process of producing three-dimensional reproductions as claimed in claim 2 wherein said scanning of said object is carried out in sequence to provide a light image on the luminescent screen of a cathode ray tube and wherein the light from said image exposes the light sensitive emulsion layer.

6. A process of producing three-dimensional reproductions as claimed in claim 2 wherein said scanning is carried out with radar scanning means.

7. A process of producing three-dimensional reproductions as claimed in claim 2 wherein said light sensitive layer is exposed about its periphery in said container by light from said light image which is projected against said periphery.

8. A process for producing three-dimensional reproductions as claimed in claim 2 including the steps of removing sections of the three-dimensional reproduction from the container corresponding to scanned portions of the object being scanned and mechanically assembling said removed portion in the same relation as in object being scanned.

9. A process for producing the dimensional reproductions as claimed in claim 2 including the step of adding a solvent for the unexposed portions of said emulsion and in which the exposed portions are insoluble to said emulsion after developed and fixing whereby the unexposed portions are dissolved.

10. A method of photo-glyph recording in three dimensions a sequence of transient pictures appearing on the luminiscent screen of at least one cathode ray tube, including the steps of projecting each transient picture into a dark recording container to expose a layer of a transparent photo-emulsion of the silver halide type suspended in gelatin placed there at the recording level, of photo-processing said exposed layer of emulsion, by developing and fixing it, of expanding said recording space to a distance controlled by one or more additional phenomena, of simultaneously carrying said exposed layer of said emulsion away from said recording level the said distance, of piling up in the space between the said exposed layer of said emulsion and the recording level a new unexposed layer of said photo-emulsion and of repeating the said steps in response to successive pictures on the said luminescent screen of said cathode ray tube.

11. An apparatus for reproducing objects to produce three-dimensional reproductions comprising means for scanning and detecting a predetermined first sector of an object transverse to a vertical direction from the base surface of the object, means to convert the detected signal into light energy which records the configuration of the scanned sector, means to project said light energy to expose a photosensitive colloid emulsion in a container, a container movable along a vertical axis corresponding to the vertical axis of the object defining the height of the sector for successive scanning operations, casting means to deliver a layer of a photosensitive colloid emulsion into said container for recording the sector of the object scanned, container means for developer and fixer solutions for said exposed emulsion, and drying means for said emulsion, and timing means to control the sequence of scanning, converting, projecting and container moving operations in synchronism with the photographic recording operations to build up a layerwise reproduction in three dimensions of the object.

12. An apparatus as claimed in claim 11 wherein said scanning means is a radar scanning means and said converting means is a cathode ray tube.

13. An apparatus as claimed in claim 11 wherein said timing means synchronizes the movement of said container along its vertical axis in accordance with the displacement of the scanning means transverse to a vertical direction of the object.

14. A photo glyph recording apparatus for recording in three dimensions a sequence of related phenomena configurations comprising a source of configurations of actinic rays, capable of exposing a photo-emulsion, said configurations including representations in two dimensions along a horizontal axis and other representations in two dimensions along a vertical axis, means for producing within said source said configurations of rays at timed intervals, means for creating a sequence of said configurations of rays, each configuration of rays corresponding to one of said phenomena configuration, a recording container for photo emulsion, means for casting a succession of layers of photosensitive emulsion into said recording container, focussing means to maintain equal focussing distance between each successive said layer of emulsion and said source of said rays, means of aligning each said separate configuration of said rays into an exposure permitting position of each separate layer of said emulsion respectively to expose one layer of said emulsion for every one configuration of said rays in vertical registration, a plurality of tanks for storing fluid photo-sensitive emulsion, developer, fixer and hardener respectively, said tanks each connected with said recording container by a pipe system, each tank equipped with time-controlled valve means to introduce its respective materials into said container, and linking and timing means for control of the sequence and of the duration of operation of said means for creating said sequence of configurations of rays within said source, of said means for casting a succession of layers of said emulsion in said container with the first layer to be cast on the bottom of said container and the subsequent layers superimposed parallel to and adjacent to each other, of said focussing means, of said means for aligning each said separate configuration of said rays with one said layer of emulsion into said exposure permitting position in registration with the adjacent layers and of the series of said valve means connected to introduce said emulsion, developer, fixer and hardener into said container after the exposure of each separate layer of said emulsion.

15. An apparatus for producing three-dimensional reproductions as claimed in claim 11 wherein said container houses a transparent removable liner into which said photosensitive colloid emulsion is cast.

16. An apparatus for producing three-dimensional reproductions as claimed in claim 11 including emulsion distributing means to feed said photosensitive colloid emulsion into said container.

17. An apparatus for producing three-dimensional reproductions as claimed in claim 11 wherein said means to project said light energy for exposing said photosensitive colloid emulsion includes a luminescent X-ray screen.

18. A photo-glyph recording apparatus for recording in three dimensions a plurality of variables such as bodies in space including an expanding dark recording container, at least one tank storing a photo-emulsion and photo-processing materials with mechanisms for their controllable distribution into said recording container, a radar system including at least one cathode ray tube equipped with luminescent photo screens directed into said recording container for a series of exposures there of said photo-emulsion, said radar system including a mechanism for scanning in a prearranged spaced and timed succession sequentially progressing planes to be recorded, said recording container being expandible at a prearranged rate of speed and content proportionally to said spaced and timed scanning of said radar mechanism, said recording apparatus including a mechanism synchronizing the said scanning with the said expansion of the recording container, with the distribution of said photo-materials in said container and with the exposure and photo-processing of said photo-emulsion, after each distribution of it, by said photo screens.

References Cited in the file of this patent

UNITED STATES PATENTS

| | | |
|---|---|---|
| 1,288,753 | Thornton | Dec. 24, 1918 |
| 1,435,283 | Procoudine-Gorsky | Nov. 14, 1922 |
| 2,309,627 | Cooke | Feb. 2, 1943 |
| 2,309,752 | Cooke | Feb. 2, 1943 |
| 2,361,390 | Ferril | Oct. 31, 1944 |
| 2,374,981 | Cooke | May 1, 1945 |
| 2,430,283 | Epstein | Nov. 4, 1947 |
| 2,446,668 | Tuttle | Aug. 10, 1948 |
| 2,590,830 | Williford et al. | Mar. 25, 1952 |
| 2,616,077 | Holser | Oct. 28, 1952 |
| 2,694,634 | Debenham | Nov. 16, 1954 |

FOREIGN PATENTS

| | | |
|---|---|---|
| 9,184 | Great Britain | of 1912 |
| 939,071 | France | Nov. 3, 1948 |